(12) United States Patent
Matsuo et al.

(10) Patent No.: US 12,103,654 B2
(45) Date of Patent: Oct. 1, 2024

(54) MARINE VESSEL PROPULSION SYSTEM, COMMUNICATION TERMINAL, AND KEYCODE SERVER

(71) Applicant: YAMAHA HATSUDOKI KABUSHIKI KAISHA, Iwata (JP)

(72) Inventors: Masashi Matsuo, Shizuoka (JP); Yuki Yamaguchi, Shizuoka (JP); Taichi Sato, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 204 days.

(21) Appl. No.: 17/372,583

(22) Filed: Jul. 12, 2021

(65) Prior Publication Data

US 2022/0055729 A1     Feb. 24, 2022

(30) Foreign Application Priority Data

Aug. 21, 2020   (JP) .................................. 2020-140328

(51) Int. Cl.
*B63H 21/21*    (2006.01)
*G05D 1/00*     (2006.01)

(52) U.S. Cl.
CPC .......... *B63H 21/21* (2013.01); *G05D 1/0016* (2013.01); *G05D 1/0022* (2013.01); *G05D 1/0206* (2013.01); *B63H 2021/216* (2013.01)

(58) Field of Classification Search
CPC .............. B63H 21/21; B63H 2021/216; G05D 1/0016; G05D 1/0022; G05D 1/0206
See application file for complete search history.

(56) References Cited

U.S. PATENT DOCUMENTS

| 9,110,774 B1* | 8/2015 | Bonn ...................... G06F 17/00 |
| 10,384,648 B1* | 8/2019 | Chapin ............... B60R 25/2009 |
| 2018/0134254 A1* | 5/2018 | Penilla ..................... G07C 9/20 |
| 2020/0062365 A1* | 2/2020 | Anderson ........... H04W 12/068 |

(Continued)

FOREIGN PATENT DOCUMENTS

| EP | 3 726 405 A1 | 10/2020 | |
| GB | 2442020 A * | 3/2008 | .......... B63H 21/213 |
| JP | 2004-044537 A | 2/2004 | |

(Continued)

OTHER PUBLICATIONS

English translation of WO-2020174544-A1.*

(Continued)

*Primary Examiner* — Anshul Sood
*Assistant Examiner* — Matthew Ho
(74) *Attorney, Agent, or Firm* — Keating & Bennett, LLP

(57) ABSTRACT

A marine vessel propulsion system includes a propulsive force generator to generate a propulsive force, a drive source to drive the propulsive force generator, and a controller configured or programmed to control the drive source to perform marine vessel maneuvering-related functions including at least one limited function. The controller includes an interface, and is further configured or programmed to include a restriction unit to restrict a control operation for the limited function, and a restriction cancellation unit to cancel the restriction effected by the restriction unit to permit the control operation for the limited function if a predetermined keycode is inputted from the interface or is registered in the controller.

11 Claims, 5 Drawing Sheets

(56) References Cited

U.S. PATENT DOCUMENTS

2020/0108795 A1   4/2020   Chapin
2020/0180744 A1   6/2020   Gonring

FOREIGN PATENT DOCUMENTS

| JP | 2013-095245 A | 5/2013 | |
|---|---|---|---|
| JP | 2014-085758 A | 5/2014 | |
| WO | 2019/114659 A1 | 6/2019 | |
| WO | WO-2020174544 A1 * | 9/2020 | ............. B60R 25/24 |

OTHER PUBLICATIONS

Official Communication issued in corresponding European Patent Application No. 21190756.3, mailed on Jan. 25, 2022.
Official Communication issued in European Patent Application No. 21 190 756.3, mailed on Nov. 7, 2023.

* cited by examiner

MARINE VESSEL PROPULSION SYSTEM, COMMUNICATION TERMINAL, AND KEYCODE SERVER

CROSS REFERENCE TO RELATED APPLICATIONS

This application claims the benefit of priority to Japanese Patent Application No. 2020-140328 filed on Aug. 21, 2020. The entire contents of this application are hereby incorporated herein by reference.

BACKGROUND OF THE INVENTION

1. Field of the Invention

The present invention relates to a marine vessel propulsion system, and a communication terminal and a keycode server for the marine vessel propulsion system.

2. Description of the Related Art

JP 2014/85758 A discloses a system which is configured to check the payment of a monthly lease fee of a car and enable or disable the startup of the engine of the car based on the check result. Specifically, when a customer pays the monthly lease fee, a monthly unlock code is sent to the customer from a lease server. On the other hand, monthly unlock codes for respective lease months are registered in a microcomputer provided in the car. When the customer inputs the sent monthly unlock code to the microcomputer, the microcomputer compares the inputted code with a monthly unlock code for that month. If these codes match each other, an engine startup electric system is unlocked, permitting the customer to start up the engine. If the codes do not match each other, the engine startup electric system cannot be unlocked, so that the customer cannot start up the engine.

In JP 2014/85758 A, the car lease system is described in detail, and the application of this system to a marine vessel having an engine startup system is described briefly but not by way of specific example. It is actually impossible to apply the lease system disclosed in JP 2014/85758 A as it is to the lease of a marine vessel. There are various problems to be solved for the application of the lease system to a marine vessel. In reality, therefore, there is no motivation to apply the lease system disclosed in JP 2014/85758 A to a marine vessel.

SUMMARY OF THE INVENTION

The inventor of preferred embodiments of the present invention focused on the fact that not all of the users of a marine vessel always need to use the various functions of a propulsion system (e.g., outboard motor) of the marine vessel, and contemplated a system which permits the users to use necessary functions upon payment of proper fees according to the various needs of the individual users.

In order to overcome the previously unrecognized and unsolved challenges described above, preferred embodiments of the present invention provide marine vessel propulsion systems which embody the systems described above.

A marine vessel propulsion system according to a preferred embodiment of the present invention applies a propulsive force to a marine vessel, and includes a propulsive force generator to generate the propulsive force, a drive source to drive the propulsive force generator, and a controller configured or programmed to control the drive source to perform a plurality of marine vessel maneuvering-related functions including at least one limited function. The controller includes an interface, and is further configured or programmed to include a restriction unit to restrict a control operation for the limited function, and a restriction cancellation unit to cancel the restriction effected by the restriction unit to permit the control operation for the limited function if a predetermined keycode is inputted from the interface or is registered in the controller.

With the above-described arrangement, the controller is configured or programmed to perform the plurality of marine vessel maneuvering-related functions including at least one limited function. The control operation for the limited function is restricted by the restriction unit. The restriction is cancelled by the restriction cancellation unit such that the use of the limited function is permitted. The restriction cancellation unit cancels the restriction effected by the restriction unit to enable the limited function based on a condition that the predetermined keycode is inputted from the interface of the controller or is registered in the controller. Therefore, the limited function is enabled by the input of a genuine keycode.

The keycode may be issued (provided) based on a condition that a user pays a fee. Thus, only a user who needs the limited function has to pay the fee, while a user who does not need the limited function does not have to pay the fee. In this manner, users are able to use necessary functions by paying fees according to their individual needs.

According to a preferred embodiment of the present invention, the limited function includes at least one of a function to increase a maximum output of the drive source, a function to maintain the marine vessel at a position, a function to cause the marine vessel to travel at a constant speed, a function to automatically operate the marine vessel, and a function to cooperate with a marine vessel maneuvering assisting device other than the marine vessel propulsion system.

A common keycode may be used to collectively cancel the restriction of two or more limited functions, or different keycodes may be used in one-to-one correspondence with the plurality of functions.

When the function of increasing the maximum output of the drive source is the limited function, the maximum output is able to be changed according to the need of the user. The function of maintaining the marine vessel at a position may be a so-called fixed-point holding function. The function of causing the marine vessel to travel at a constant speed may be a cruise control function or a trolling function. The function of automatically operating the marine vessel may be a so-called autopilot function. The function of cooperating with the marine vessel assisting device is, for example, a function of permitting cooperation with any of various marine vessel maneuvering assisting devices connected to the controller.

According to a preferred embodiment of the present invention, if a keycode having valid period information is inputted as the keycode from the interface or is registered as the keycode in the controller, the restriction cancellation unit cancels the restriction effected by the restriction unit only during a valid period indicated by the valid period information.

With the above-described arrangement, the limited function corresponding to the keycode inputted to the controller or the keycode registered in the controller is able to be used only during the valid period indicated by the valid period information. Thus, the limited function is used according to the user's need and other factors.

According to a preferred embodiment of the present invention, the interface includes a communication interface to communicate with a keycode server via a communication line, and to acquire the keycode from the keycode server.

With the above-described arrangement, the keycode for the limited function is maintained in the keycode server, and the keycode is acquired through communication. Thus, a genuine keycode is properly maintained, and speedily provided to the user. Therefore, the user is able to use the limited function properly and easily. In addition, the controller communicates with the keycode server via the communication line so that the genuine keycode is provided to the controller in an errorless manner.

According to a preferred embodiment of the present invention, the interface includes a communication interface to communicate with a communication terminal operated by the user, and to acquire the keycode from the communication terminal.

With the above-described arrangement, the controller communicates with the communication terminal owned by the user to acquire the keycode so that the genuine keycode is easily provided to the controller.

According to a preferred embodiment of the present invention, a keycode issuing request is transmitted to the keycode server from the communication terminal operated by the user, and the keycode server checks an issuing requirement and then issues a keycode corresponding to the keycode issuing request.

With the above-described arrangement, the keycode for the limited function is maintained in the keycode server, and the user is able to transmit the keycode issuing request to the keycode server by operating the terminal device. Upon receiving the keycode issuing request from the communication terminal, the keycode server checks the issuing requirement and then issues the corresponding keycode. Therefore, the issuing of the keycode is properly managed.

According to a preferred embodiment of the present invention, the keycode issuing request to be transmitted to the keycode server from the communication terminal includes individual identification information of the marine vessel propulsion system, and the keycode server uses the individual identification information to manage the issuing of the keycode.

With the above-described arrangement, the keycode server is able to properly manage the issuing of the keycode in association with the individual identification information of the marine vessel propulsion system.

Another preferred embodiment of the present invention provides a communication terminal to be used in combination with the marine vessel propulsion system described above. The communication terminal may be a mobile information terminal to be held by the user.

A further preferred embodiment of the present invention provides a keycode server to be used in combination with the marine vessel propulsion system.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
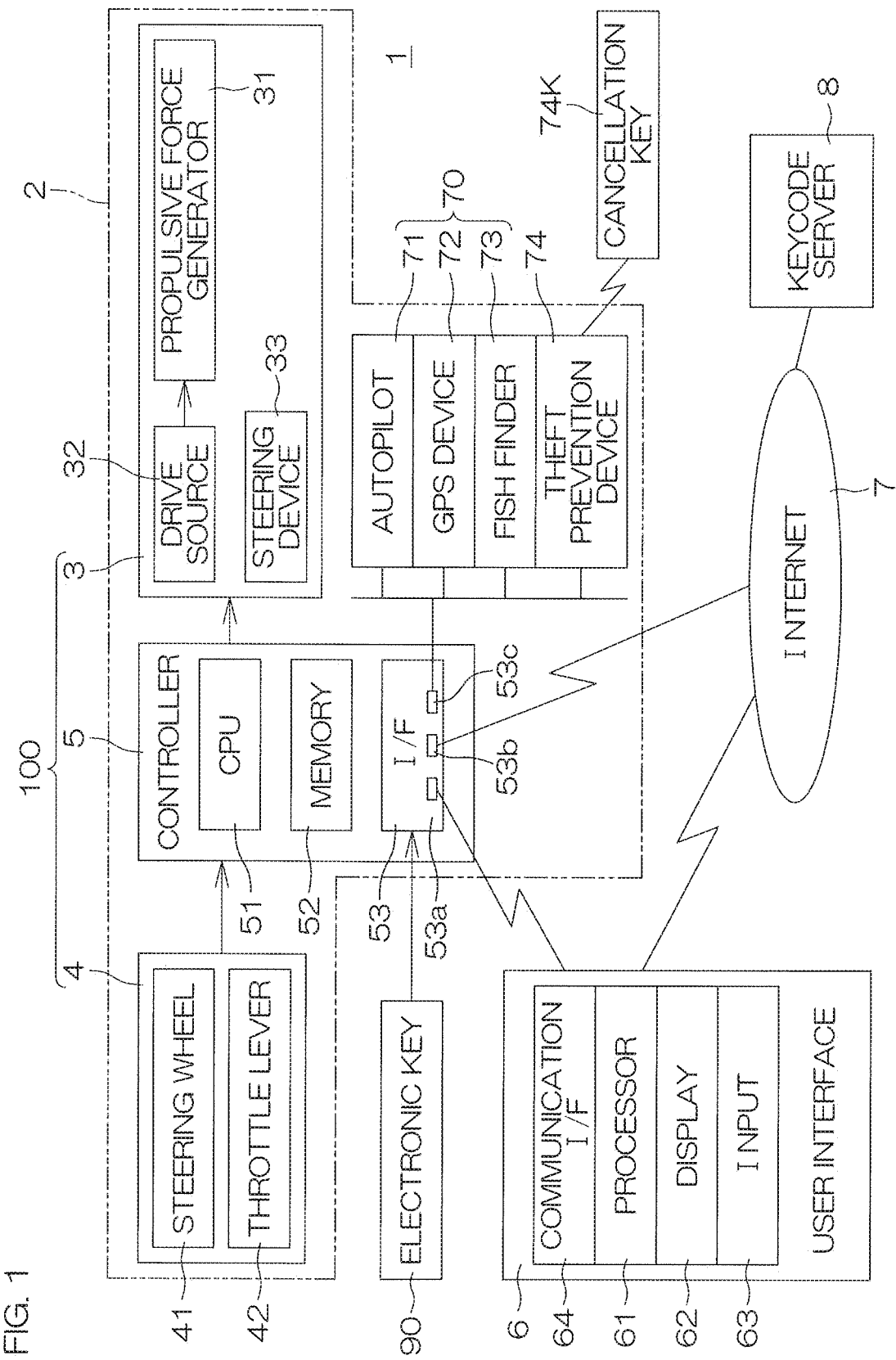
FIG. 1 is a block diagram that shows an electrical configuration of a marine vessel including a marine vessel propulsion system according to a preferred embodiment of the present invention.

FIG. 1 is a block diagram that shows an electrical configuration of a marine vessel including a marine vessel propulsion system according to a preferred embodiment of the present invention. The marine vessel 1 includes a hull 2, a propulsion unit 3 provided in the hull 2, a marine vessel maneuvering system 4 provided in the hull 2, and a controller 5 provided in the hull 2. The propulsion unit 3 and the controller 5 define the marine vessel propulsion system 100 that applies a propulsive force to the hull 2. The propulsion unit 3 includes a propulsive force generator 31 (propeller), a drive source 32 to drive the propulsive force generator 31, and a steering device 33. The controller 5 controls various control objects provided in the marine vessel 1 to perform various functions related to marine vessel maneuvering. The control objects include, for example, the propulsion unit 3, particularly the drive source 32 for the propulsion unit 3. The control objects may further include the steering device 33. The controller 5 may be integral with the propulsion unit 3. Further, the controller 5 may be integral with the marine vessel maneuvering system 4.

The propulsion unit 3 may include an electric outboard motor. In this case, the drive source 32 is an electric motor. The propulsive force generator 31 is driven by the drive source 32 to generate the propulsive force. The propulsive force is applied to the hull 2. The steering device 33 changes the direction of the propulsive force laterally of the hull 2.

The marine vessel maneuvering system 4 is operated by a user in order to control the magnitude of the propulsive force generated by the propulsion unit 3 and to control the direction of the propulsive force generated by the propulsion unit 3. Specifically, the marine vessel maneuvering system 4 includes a steering wheel 41 to control the direction of the propulsive force, and a throttle lever 42 to control the output of the drive source 32.

The controller 5 includes a processor 51 (CPU) and a memory 52 (storage device). A program for the plurality of marine vessel maneuvering-related functions and various data are stored in the memory 52. The memory 52 is able to retain the stored data in at least a portion of its storage area even after the power supply to the controller 5 is turned off. More specifically, the memory 52 includes a nonvolatile memory. The processor 51 executes the program stored in the memory 52 such that the controller 5 controls the control objects to perform the various functions. The controller 5 includes an interface 53 (I/F).

A user interface 6 is connectable to the interface 53. More specifically, the interface 53 includes a communication interface 53a to connect the controller 5 to the user interface 6 to perform communication. The communication may be wired or may be wireless.

The user interface 6 may include a processor 61, a display 62, an input 63, and a communication interface 64 (I/F). The input 63 may include a keyboard and/or a pointing device, or may be a touch panel disposed on the screen of the display 62.

The user interface 6 may be a communication terminal wired to or wirelessly connected to the communication interface 53a of the controller 5 via its communication interface 64. The user interface 6 may be fixed to the propulsion unit 3 or the hull 2, or may be separate from the propulsion unit 3 and the hull 2. When the communication interface 53a includes a wireless communication interface, the user interface 6 may be a mobile device held by the user, i.e., a mobile information terminal. More specifically, the user interface 6 may be a smartphone or a computer loaded with an appropriate application program. The user interface 6 is not required to be always connected to the communication interface 53a of the controller 5, but may be connected to the communication interface 53a as required.

The interface 53 of the controller 5 may include a communication interface 53b to connect to a wide area network (WAN) such as the internet 7. Communication between the communication interface 53b and the internet 7 may be wired communication, or may be wireless communication. The controller 5 is able to communicate with a keycode server 8 connected to the internet 7 via the communication interface 53b.

The interface 53 may further include a device interface 53c to connect to various devices. For example, a marine vessel maneuvering assisting device 70, a theft prevention device 74, and the like may be connected to the device interface 53c. Examples of the marine vessel maneuvering assisting device 70 include an autopilot device 71, a GPS (Global Positioning System) device 72, and a fish finder 73.

Figure 2:
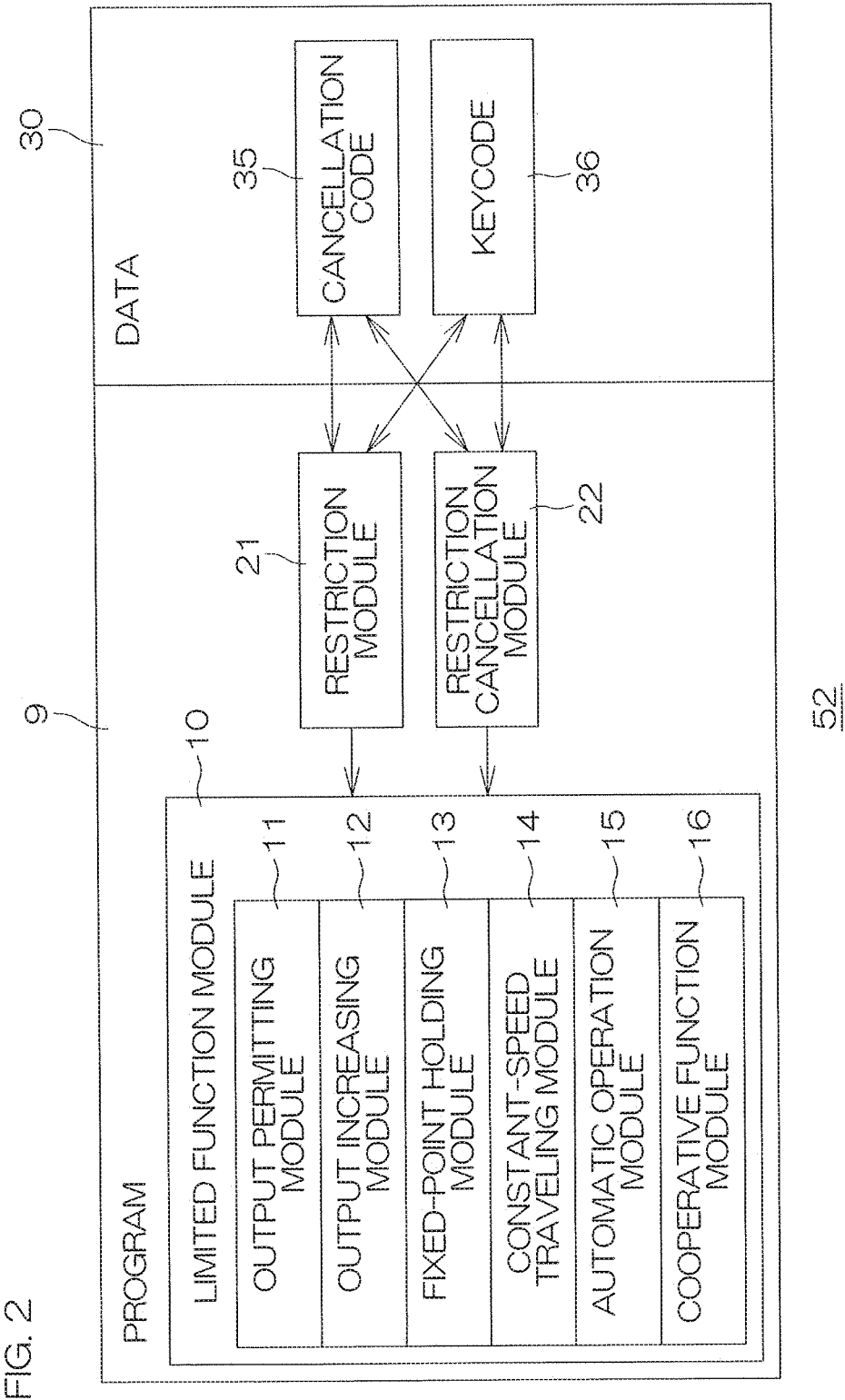
FIG. 2 is a diagram that describes a program and data stored in a memory of a controller of the marine vessel propulsion system.

FIG. 2 is a diagram that describes the program 9 and the data 30 stored in the memory 52 of the controller 5. The program 9 includes a plurality of program modules. The program modules include limited function modules 10 to perform limited functions, a restriction module 21 (restriction unit) to restrict any of the functions to be performed by the limited function modules 10, and a restriction cancellation module 22 (restriction cancellation unit) to cancel the function restriction effected by the restriction module 21. Examples of the limited function modules 10 include an output permitting module 11 to permit the output of the drive source 32, an output increasing module 12 to increase the maximum output of the drive source 32, a fixed-point holding module 13 to maintain the marine vessel 1 at a position, a constant-speed traveling module 14 to cause the marine vessel 1 to travel at a constant speed, an automatic operation module 15 to automatically operate the marine vessel 1, and a cooperative function module 16 to perform a cooperative function with the marine vessel maneuvering assisting device 70.

A cancellation code area 35 is provided in the storage area of the memory 52 of the controller 5. The cancellation code area 35 is a nonvolatile storage area. Cancellation codes to enable the limited function modules 10 (to cancel the restriction) are stored in the cancellation code area 35. The cancellation codes include a cancellation code to enable the output permitting module 11, a cancellation code to enable the output increasing module 12, a cancellation code to enable the fixed-point holding module 13, a cancellation code to enable the constant-speed traveling module 14, a cancellation code to enable the automatic operation module 15, a cancellation code to enable the cooperative function module 16, and the like. These cancellation codes may include at least two identical cancellation codes (i.e., some or all of the cancellation codes may be identical), or all of the cancellation codes may be different. Here, an exemplary case in which all of the cancellation codes for the limited function modules 10 are different will be described.

The functions to be performed by the limited function modules 10 are each a limited function. The user acquires a restriction cancellation keycode from the keycode server 8 such that the limited function is enabled (i.e., the restriction is cancelled). For example, the user accesses the keycode server 8, and performs an acquisition procedure to acquire a desired limited function to acquire a keycode. The acquisition procedure may be, for example, a purchase procedure to purchase a use license to use the desired limited function. The purchase procedure includes, for example, a registration procedure to register an identification number as individual identification information solely assigned to the propulsion unit 3, user information, and the like in the keycode server 8, and a payment procedure to pay a purchase fee.

The keycode server 8 provides the keycode to the user based on the registered information based on a condition that the payment procedure is completed. The keycode may be transmitted to the user interface 6 from the keycode server 8. Further, the keycode may be transmitted to the controller 5 from the keycode server 8. The keycode may be transmitted to an information terminal owned by the user and connectable to the internet 7. Further, the keycode may be provided to the user from the keycode server 8 not only by electronic communication but also by conventional communication such as postal service. The keycode may be provided as electronic information (e.g., as encrypted data), or may be provided as text information.

A keycode area 36 to register the keycode acquired by the user may be provided in the storage area of the memory 52 of the controller 5. The keycode area 36 is preferably a nonvolatile storage area. The user operates the user interface 6 to input the acquired keycode to the controller 5. The controller 5 registers the inputted keycode in the keycode area 36. When the keycode is provided directly to the controller 5, the controller 5 registers the provided keycode in the keycode area 36.

The controller 5 compares the keycode inputted via the interface 53 or the keycode registered in the keycode area 36 with the cancellation codes registered in the cancellation code area 35. If the keycode matches (e.g., coincides with) a cancellation code for a certain limited function, the restriction cancellation module 22 enables the corresponding limited function module 10 (cancels the restriction of the corresponding limited function module 10). If the keycode does not match (e.g., does not coincide with) the cancellation code for the certain limited function, the restriction module 21 maintains the corresponding limited function module 10 in a disabled state. Thus, only the limited function module 10 corresponding to the limited function for which the genuine keycode is inputted or registered is enabled, and the user is able to use the limited function.

Figure 3:
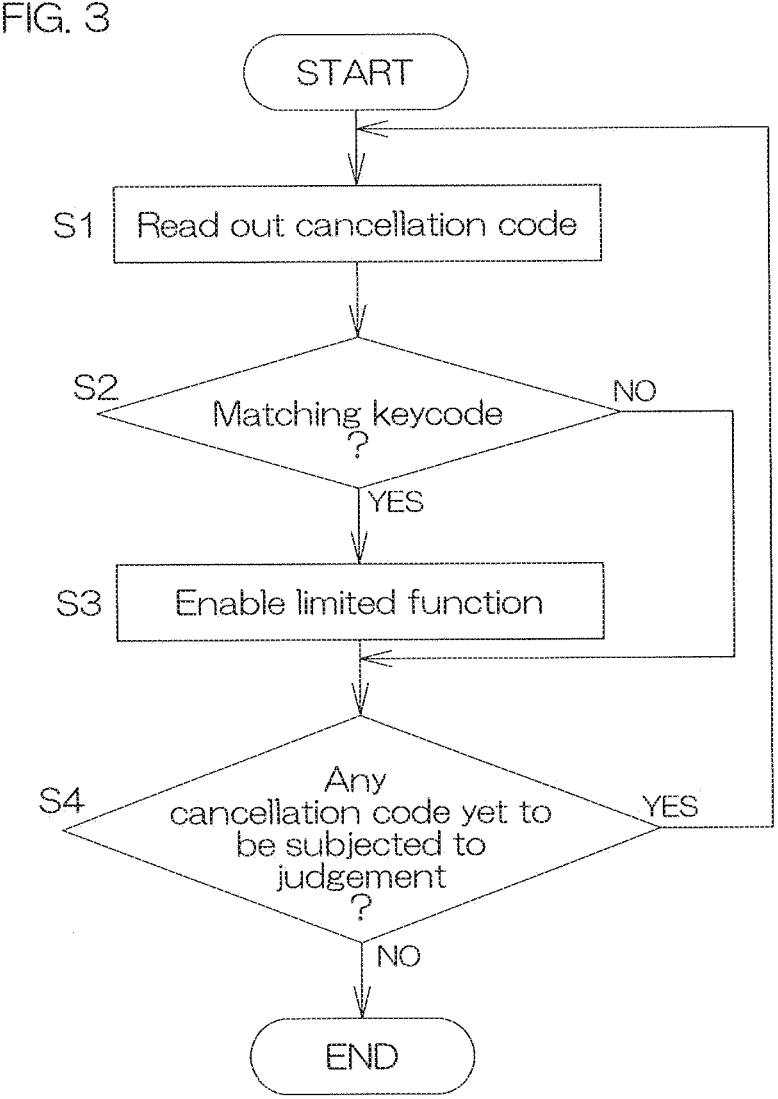
FIG. 3 is a flow chart that describes an operation to be performed by the controller.

FIG. 3 is a flowchart that describes an operation to be performed by the controller 5. When the controller 5 is activated, the controller 5 compares the keycode registered in the keycode area 36 with the cancellation codes registered in the cancellation code area 35. Specifically, the controller 5 sequentially reads out the cancellation codes corresponding to the respective limited functions one by one from the cancellation code area 35 (Step S1), and determines if a keycode matching the cancellation code thus read out is present in the keycode area 36 (Step S2). If the matching keycode is present in the keycode area 36, the controller 5 enables a limited function module 10 corresponding to the keycode (Step S3). If the matching keycode is not present in the keycode area 36, the controller 5 maintains the corresponding limited function module 10 in the disabled state. This operation is performed for all of the cancellation codes (Step S4).

Figure 4:
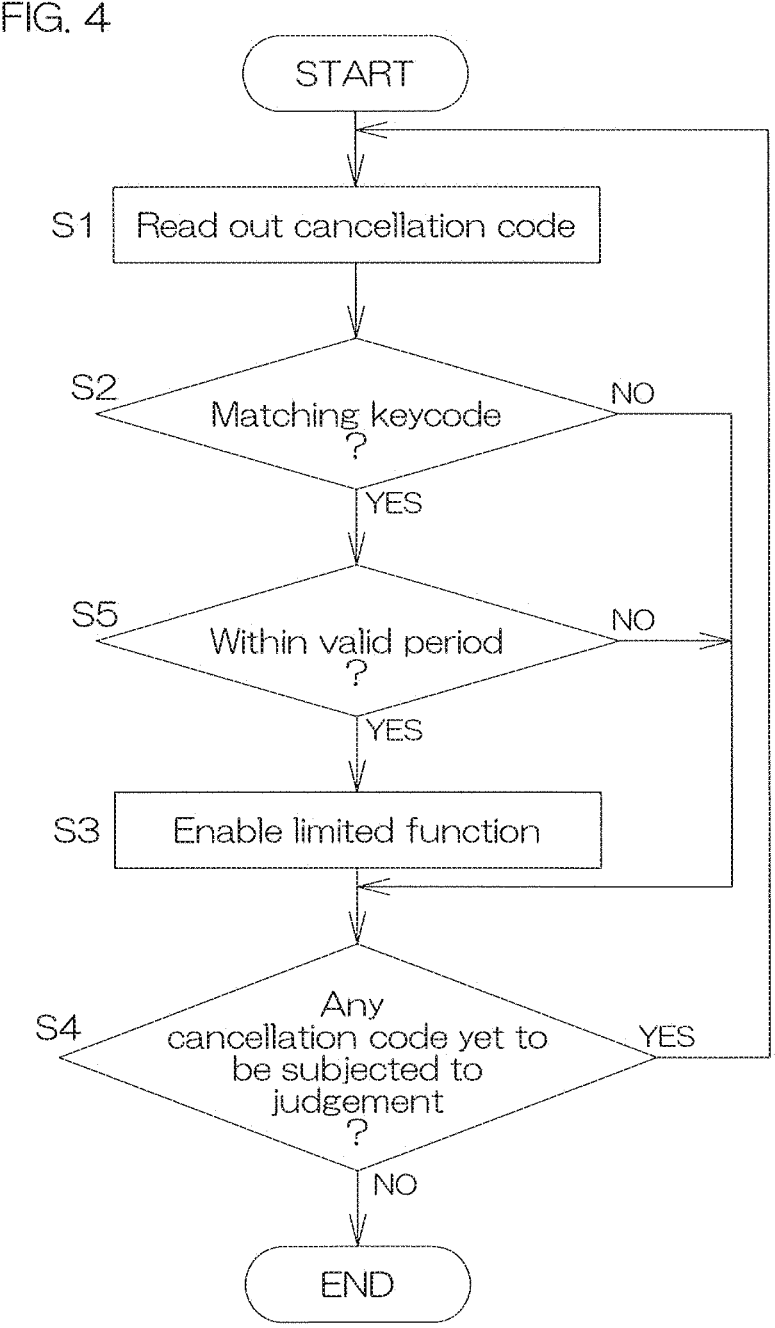
FIG. 4 is a flow chart that describes an operation to be performed by the controller when valid period information is added to a keycode.

Valid period information may be added to the keycode. In this case, the controller 5 enables the corresponding limited function only during a valid period indicated by the valid period information. In this case, the controller 5 operates as shown in FIG. 4. When the controller 5 is activated, the controller 5 compares the keycode registered in the keycode area 36 with the cancellation codes registered in the cancellation code area 35. Specifically, the controller 5 sequentially reads out the cancellation codes corresponding to the respective limited functions one by one from the cancellation code area 35 (Step S1), and determines if a keycode matching the cancellation code thus read out is present in the keycode area 36 (Step S2). If the matching keycode is present in the keycode area 36, the controller 5 further determines if the current time is within the valid period with reference to the valid period information added to the keycode (Step S5). If the current time is within the valid period, the controller 5 enables a limited function module 10 corresponding to the keycode (Step S3). If the matching keycode is not present in the keycode area 36 (NO in Step S2), the controller 5 maintains the corresponding limited function module 10 in the disabled state. If the matching keycode is present in the keycode area 36 (YES in Step S2) and the current time is not within the valid period of the keycode (NO in Step S5), the controller 5 maintains the corresponding limited function module 10 in the disabled state. This operation is performed for all of the cancellation codes (Step S4).

The current time may be acquired with reference to a clock incorporated in the controller 5. Further, when a device (e.g., the GPS device 72) that is able to generate current time information is connected to the controller 5, the controller 5 may acquire the current time information from such a device.

Figure 5:
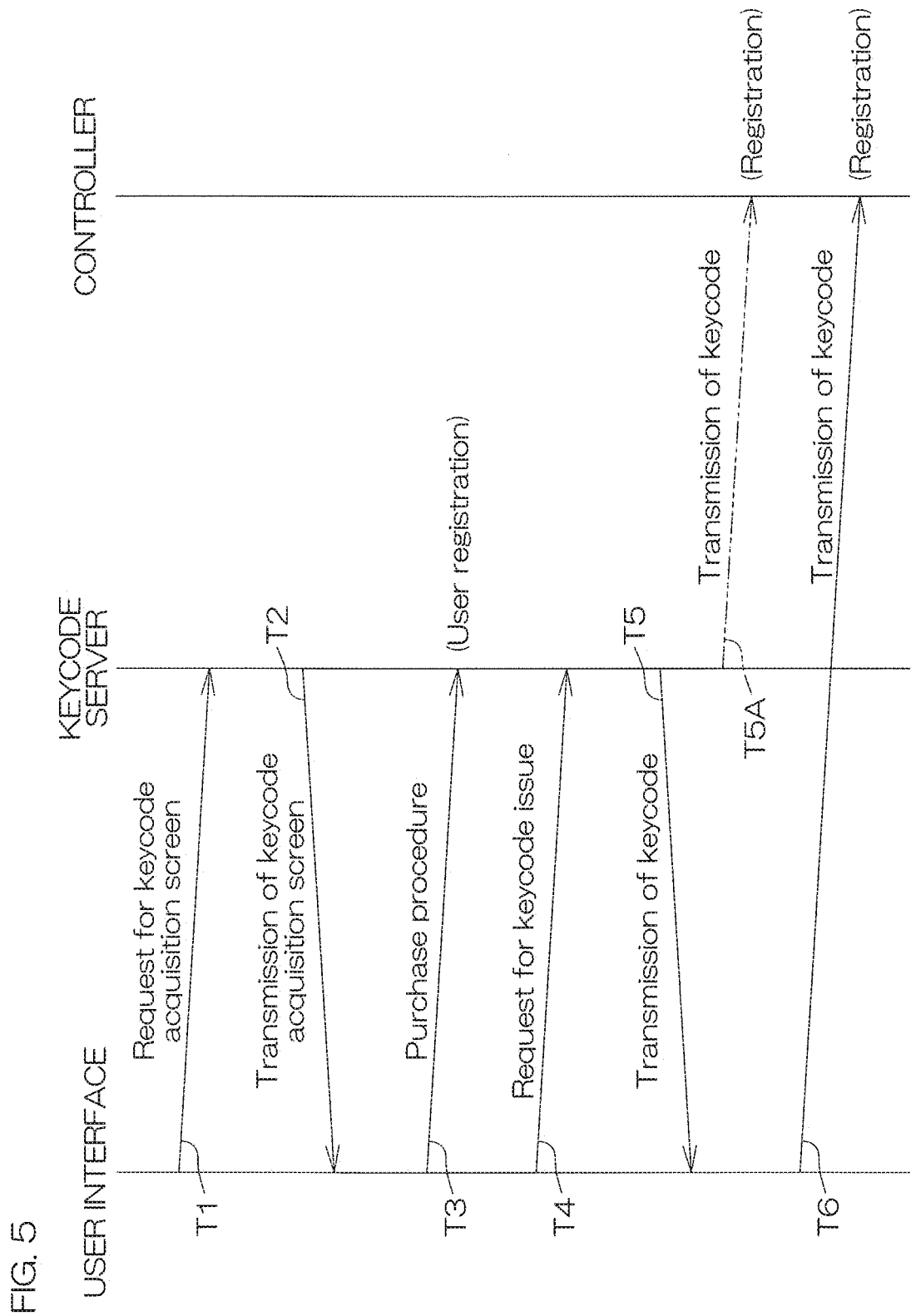
FIG. 5 is a communication flow diagram that describes an exemplary keycode acquiring operation.

FIG. 5 is a communication flow diagram that describes an exemplary keycode acquiring operation.

The user operates the user interface 6 to access the keycode server 8 (T1). The keycode server 8 transmits a keycode acquisition screen to the user interface 6 (T2). On the keycode acquisition screen, the user inputs a desired limited function, the identification number (individual identification information) of the propulsion unit 3, the user information, and the like to perform the purchase procedure (T3), and transmits a keycode issuing request (T4). The inputted information is registered in the keycode server 8. The keycode server 8 transmits, for example, a payment screen for the payment of the purchase fee for the use license of the desired limited function to the user interface 6. The user performs the purchase procedure to purchase the use license by inputting necessary payment information on the payment screen.

If the purchase procedure is properly completed, the keycode server 8 transmits a keycode to the user interface 6 (T5). The user operates the user interface 6 to register the keycode in the controller 5 (T6). Alternatively, the user interface 6 may automatically register the keycode acquired from the keycode server 8 in the controller 5 without waiting for the operation by the user. As described above, the keycode server 8 may transmit the keycode directly to the controller 5 (T5A).

Since the use license purchase information for the limited function is retained in the keycode server 8, the user is able to acquire the keycode again from the keycode server 8 if necessary. In this case, the user accesses the keycode server 8 to perform a predetermined reacquisition operation. That is, the user is able to request the keycode server 8 to reissue the keycode by operating the user interface 6 or the like (T3). In this case, also, the keycode issuing request including the identification number (individual identification information) of the propulsion unit 3, the user information, and the like is preferably transmitted to the keycode server 8. The keycode server 8 retrieves the use license purchase information and, if it is confirmed that the use license has been purchased, reissues the keycode and transmits the keycode to the user interface 6 (or the controller 5).

For example, the output permitting module 11 performs a process to permit the output of the drive source 32, i.e., to permit the propulsion unit 3 to output the propulsive force, to provide an essential function. Therefore, a keycode for the output permitting module 11 may be issued by properly performing the purchase procedure for the propulsion unit 3. Specifically, the keycode server 8 may issue an unlimited-period keycode based on a condition that it is confirmed that all of the purchase fees for the propulsion unit 3 have been paid. Further, when the propulsion unit 3 is purchased on a loan basis or utilized on a lease basis, the keycode server 8 may issue a keycode having a valid period for which the payment has been made. Therefore, the user is able to utilize the propulsion unit 3 based on a condition that the proper payment has been made.

According to the present preferred embodiment, as described above, the marine vessel propulsion system 100 that applies the propulsive force to the marine vessel 1 includes the propulsion unit 3 and the controller 5. The propulsion unit 3 includes the propulsive force generator 31 and the drive source 32 that drives the propulsive force generator 31. The controller 5 controls the various control objects including the drive source 32 for the plurality of marine vessel maneuvering-related functions. Specifically, the controller 5 executes the program 9 to control the control objects to perform the various functions. The functions to be performed by the program 9 include the limited functions. The program 9 includes the limited function modules 10 to perform the limited functions. The limited function modules 10 are disabled in the initial state. Accordingly, the functions to be provided by the limited function modules 10 are disabled. When a predetermined keycode is inputted from the interface 53 or is registered in the controller 5, the controller 5 enables the corresponding limited function module 10. Thus, the restriction of the limited function is cancelled to permit the control operation for the limited function. Therefore, the limited function is enabled by the input or the registration of the genuine keycode.

The keycode is issued (provided), for example, based on a condition that the user pays the fee. Thus, only the user who needs the limited function has to pay the fee, while a user who does not need the limited function does not have to pay the fee. In this manner, the users are able to use necessary functions by paying fees according to their individual needs.

In the present preferred embodiment, the limited function modules 10 include the output permitting module 11, the output increasing module 12, the fixed-point holding module 13, the constant-speed traveling module 14, the automatic operation module 15, and the cooperative function module 16.

By properly paying the purchase fee for the marine vessel propulsion system 100, the keycode for the output permission is issued. If this keycode is inputted or registered in the controller 5, the output permitting module 11 is enabled to permit the use of the marine vessel propulsion system 100.

When an output increasing function to increase the maximum output of the drive source 32 is defined as the limited function, the maximum output is able to be changed according to the user's need. A user who needs a greater propulsive force enables the output increasing module 12 by paying a fee, performing a keycode issuing procedure to enable the output increasing module 12, and then inputting or registering an issued keycode in the controller 5. In the market, the price of the marine vessel propulsion system 100 is generally increased, as the output (propulsive force) increases. Therefore, it is reasonable that the fee to be paid by the user varies depending on the enabled/disabled status of the output increasing module 12. In some country or region, for example, a marine vessel propulsion system 100 having an output less than a predetermined level requires no use license, while a marine vessel propulsion system 100 having an output not less than the predetermined level requires a use license. In such a county or region, the keycode is issued after it is confirmed that the user has the license such that the maximum output is properly restricted depending on whether or not the user has the license. A similar system may be utilized in a country or region where the maximum output is restricted depending on the age of the user (operator). That is, the keycode is issued after it is confirmed that the user is older than a predetermined age such that the maximum output is properly restricted depending on the age of the user. When the marine vessel 1 including the marine vessel propulsion system 100 is used on a rental basis and a plurality of users are expected to use the marine vessel 1, for example, the maximum output can be restricted according to the skill of the user by selecting whether or not to input the keycode (or whether or not to provide the keycode to the user) according to the statement of the user. When the keycode is inputted (or the keycode is provided to the user) to increase the maximum output (or to permit the increase of the maximum output), for example, an optional fee may be added to the rental fee.

It is sometimes desired to increase the maximum output not only to provide a greater propulsive force but also to increase the electric power generation amount of a power generator. In some case, specifically, the drive source 32 includes an engine, and the output of the engine is utilized to cause the propulsive force generator 31 to generate the propulsive force and to drive the power generator. If the power consumption is increased in the marine vessel 1 and the electric power generation amount of the power generator is correspondingly increased, the maximum output (maximum propulsive force) is reduced. In a pleasure boat, particularly, inboard electric appliances are often used, so that a greater electric power generation capacity is desired. Therefore, it is desirable to use the maximum output increasing function for a greater electric power demand.

A fixed-point holding function to be performed by the fixed-point holding module 13 is convenient, for example, when the marine vessel 1 is maintained at a fixed position after arriving at a fishing point. The fixed-point holding function is performed, for example, by automatically controlling the magnitude and the direction of the propulsive force based on a positioning result obtained by a positioning device such as the GPS device 72. The use of the fixed-point holding function is permitted by inputting a predetermined keycode from the interface 53 to register the keycode in the controller 5. Therefore, whether or not to input the keycode may be selected depending on whether or not to use the fixed-point holding function. When the marine vessel 1 including the marine vessel propulsion system 100 is rented, for example, whether or not to input the keycode (or whether or not to provide the keycode to the user) may be selected according to a statement made by the user on whether or not to use the fixed-point holding function. When the keycode is inputted (or the keycode is provided to the user) to use the fixed-point holding function, for example, an optional fee may be added to the rental fee.

A function to cause the marine vessel 1 to travel at a constant speed (the function of the constant-speed traveling module 14) may be a cruise control function or a trolling function. The cruise control function causes the marine vessel 1 to travel at a relatively high constant speed. The trolling function causes the marine vessel 1 to travel at a relatively low constant speed (at a very low constant speed). The trolling function is typically used for fishing while moving the marine vessel 1. When the marine vessel 1 or the marine vessel propulsion system 100 is rented, the constant-speed traveling function (the cruise control function or the trolling function) may be optional. The fee may be charged to the user depending on the statement of the user, and then the corresponding keycode may be inputted to the controller 5 or may be provided to the user.

The automatic operation module 15 performs an autopilot function to cause the controller 5 to automatically control the control objects such as the drive source 32 to navigate the marine vessel 1 along a preset sailing route. The sailing route may be set by the user, or may be set by automatic calculation based on a destination set by the user (e.g., on a map). The function to automatically operate the marine vessel 1 may be an automatic berthing function. The automatic berthing function is a function to cause the controller 5 to automatically control the control objects such as the drive source 32 to berth the marine vessel 1 at a preset target berthing position (e.g., for docking). The target berthing position may be set by the user on a map displayed on the display, or may be set by the user in an image around the marine vessel 1 photographed and outputted by a camera and displayed on the display. Further, the controller 5 may analyze the image around the marine vessel 1, extract some candidate berthing positions, and then display the candidate berthing positions on the display. The user may select one of the candidate berthing positions to set the target berthing position. When the marine vessel 1 or the marine vessel propulsion system 100 is rented, the automatic operation function may be optional. The fee may be charged to the user depending on the statement of the user, and then the corresponding keycode may be inputted to the controller 5 or may be provided to the user.

The cooperative function module 16 performs a cooperative function to cooperate with the various devices of the marine vessel maneuvering assisting device 70 connected to the controller 5. Specific examples of the marine vessel maneuvering assisting device 70 include the fish finder 73 and the GPS device 72. For example, the fish finder 73 may be provided onboard and connected to the controller 5, and a function to cause the controller 5 to control the control objects such as the drive source 32 so as to track a fish shoal may be provided as the cooperative function. The autopilot function described above may be performed by using the autopilot device 71 connected to the interface 53. In this case, the autopilot function is performed as the cooperative function. When the marine vessel 1 or the marine vessel propulsion system 100 is rented, the cooperative function may be optional. The fee may be charged to the user depending on the statement of the user, and the corresponding keycode may be inputted or provided to the user. The marine vessel maneuvering assisting device 70 is often added to the marine vessel 1 after the purchase of the marine vessel 1. In this case, the cooperative function may be required afterward.

In the present preferred embodiment, when the valid period information is added to the keycode, the limited function corresponding to the keycode is enabled only during the valid period indicated by the valid period information. Thus, the limited function is able to be used according to the user's need and other factors. When the fee for the marine vessel propulsion system 100 is paid on a loan basis or on a lease basis, the valid period is able to be limited to a period for which the payment has been made. This makes it possible to urge the user to pay the fee. When the marine vessel propulsion system 100 or the marine vessel 1 is rented, the valid period may be set, for example, to a rental period. When an optional use period for which the limited function selected as the optional function is used is separately defined, the optional use period may be set as the valid period. Thus, the user is able to use the limited function according to the fee paid by the user. Particularly, a pleasure marine vessel (e.g., for fishing or boarding) is generally used in a limited season or at a reduced frequency. In this case, a keycode having valid period information which defines a marine vessel using period as the valid period may be used such that the cost efficiency is increased.

In the present preferred embodiment, the interface 53 of the controller 5 includes the communication interface 53*b* which communicates with the keycode server 8 via the communication line (internet 7), making it possible to acquire the keycode directly from the keycode server 8. Therefore, the keycode for the limited function is maintained in the keycode server 8, and is acquired via communication. Thus, the genuine keycode is properly maintained, and is speedily provided to the user. Accordingly, the user is able to use the limited function properly and easily. In addition, the controller 5 communicates with the keycode server 8 via the communication line (internet 7), so that the genuine keycode is provided to the controller 5 in an errorless manner.

As described above, the interface 53 of the controller 5 includes the communication interface 53*a* which communicates with the user interface 6, which is an example of the communication terminal to be operated by the user. The controller 5 may acquire the keycode from the user interface 6 via the communication interface 53*a*. Thus, the controller 5 communicates with the user interface 6 to acquire the keycode and, therefore, the genuine keycode is easily provided to the controller 5.

In the present preferred embodiment, the keycode issuing request is transmitted to the keycode server 8 from the user interface 6, and the keycode server 8 checks an issuing requirement and then issues a keycode corresponding to the keycode issuing request. That is, the keycode for the limited function is maintained in the keycode server 8, and is acquired through communication between the user interface 6 and the keycode server 8. Upon receiving the keycode issuing request from the user interface 6, the keycode server 8 checks the issuing requirement, and then issues the corresponding keycode so that the issuing of the keycode is properly managed. The issuing requirement may include a condition that the fee for the cancellation of the restriction of the corresponding limited function is paid. Thus, the fee to enable the limited function is reliably received.

In the present preferred embodiment, the user interface 6 transmits the keycode issuing request including the identification number (individual identification information) of the marine vessel propulsion system 100 to the keycode server 8, and the keycode server 8 manages the issuing of the keycode with the use of the identification number. Thus, the keycode server 8 properly manages the issuing of the keycode in association with the identification number of the marine vessel propulsion system 100. For example, the keycode may be issued in one-to-one correspondence with the identification number. Thus, the issued keycode is effective only for the single marine vessel propulsion system 100, and is used to enable the limited function of the marine vessel propulsion system 100. Therefore, the issuing of the keycode is properly managed.

While preferred embodiments of the present invention have been described above, the present invention may be embodied in other ways.

In the preferred embodiments described above, the keycode is registered in the controller 5 from the user interface 6 or the keycode server 8 by way of example, but the registration of the keycode may be achieved in other ways. Specifically, an electronic key 90 (see FIG. 1) in which a keycode (preferably an encrypted keycode) is stored may be connected to the interface 53, and the controller 5 may read out the keycode and compare the keycode with the cancellation code. The electronic key 90 may include an interface connectable to the interface 53, and is typically a dongle as a USB memory. When a plurality of users share the marine vessel 1, for example, a plurality of electronic keys 90 are prepared, in which keycodes for the limited functions needed by the respective users are stored such that the limited functions are provided according to the individual users' needs. Specifically, when a parent and a child share the marine vessel 1, an electronic key 90 in which the keycode to enable the output increasing function is stored may be held by the parent, and an electronic key 90 in which the keycode to enable the output increasing function is not stored may be held by the child. A preferred embodiment that utilizes the electronic key 90 is often advantageous because the keycode is inputted to the controller 5 without the need for communication via the internet 7.

The same function as the electronic key 90 may be achieved by utilizing a cancellation key 74K (see FIG. 1) for the theft prevention device 74. That is, the cancellation key 74K may generate a keycode (preferably an encrypted keycode), which is in turn sent to the interface 53 from the theft prevention device 74.

In the preferred embodiments described above, the keycode sent from the user interface 6 or the keycode server 8 is registered in the memory 52 of the controller 5 by way of example. However, the keycode is not necessarily required to be registered in the controller 5. For example, the keycode may be inputted to the controller 5 from the user interface 6 through communication between the user interface 6 and the controller 5 whenever the marine vessel propulsion system 100 is utilized. Further, the keycode issuing request may be sent to the keycode server 8 from the user interface 6 whenever the marine vessel propulsion system 100 is utilized and, in response to the keycode issuing request, the keycode may be sent to the controller 5 from the keycode server 8 via the internet 7. However, this system should be employed when the connection to the internet 7 is ensured.

An input (e.g., a key input) may be connected to the interface 53 of the controller 5, and the user may operate the input to input the keycode to the controller 5.

In the preferred embodiments described above, the keycode is inputted to the controller 5 by using the user interface 6 by way of example, but a dedicated tool to be used by a service person may be connected to the interface 53, and the keycode may be registered in the controller 5 from the dedicated tool.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A marine vessel propulsion system for applying a propulsive force to a marine vessel, the marine vessel propulsion system comprising:
   a propulsive force generator to generate the propulsive force;
   a drive source to drive the propulsive force generator; and
   a controller configured or programmed to control the drive source to perform a plurality of marine vessel maneuvering-related functions including at least one limited function; wherein
   the controller includes an interface;
   the controller is further configured and programmed to include a restriction unit to restrict a control operation for the at least one limited function, and a restriction cancellation unit to cancel the restriction effected by the restriction unit to permit the control operation for the at least one limited function when a predetermined keycode is inputted from the interface or is registered in the controller;
   if the predetermined keycode includes valid period information, the restriction cancellation unit cancels the restriction effected by the restriction unit during a valid period indicated by the valid period information; and
   the at least one limited function includes a function to cause the marine vessel to travel at a constant speed.

2. The marine vessel propulsion system according to claim 1, wherein the at least one limited function further includes at least one of:
   a function to increase a maximum output of the drive source;
   a function to maintain the marine vessel at a position;
   a function to automatically operate the marine vessel; or
   a function to cooperate with a marine vessel maneuvering assisting device other than the marine vessel propulsion system.

3. The marine vessel propulsion system according to claim 1, wherein the interface includes a communication interface to communicate with a keycode server via a communication line, and to acquire the keycode from the keycode server.

4. The marine vessel propulsion system according to claim 1, wherein the interface includes a communication interface to communicate with a communication terminal operated by a user, and to acquire the keycode from the communication terminal.

5. The marine vessel propulsion system according to claim 1, wherein, when a keycode issuing request is transmitted to a keycode server from a communication terminal operated by a user, the keycode server checks an issuing requirement and then issues a keycode corresponding to the keycode issuing request.

6. The marine vessel propulsion system according to claim 5, wherein
   the keycode issuing request to be transmitted to the keycode server from the communication terminal includes individual identification information of the marine vessel propulsion system; and
   the keycode server uses the individual identification information to manage the issuing of the keycode.

7. A communication terminal in combination with the marine vessel propulsion system according to claim 4.

8. The communication terminal according to claim 7, wherein the communication terminal is a mobile information terminal to be held by the user.

9. A keycode server in combination with the marine vessel propulsion system according to claim 5.

10. A marine vessel propulsion system for applying a propulsive force to a marine vessel, the marine vessel propulsion system comprising:
    a propulsive force generator to generate the propulsive force;
    a drive source to drive the propulsive force generator; and
    a controller configured or programmed to control the drive source to perform a plurality of marine vessel maneuvering-related functions including a plurality of limited functions; wherein
    the controller includes an interface;
    the controller is further configured and programmed to include a restriction unit to restrict a control operation for the plurality of limited functions, and a restriction cancellation unit to cancel the restriction effected by the restriction unit to permit the control operation for the plurality of limited functions when a predetermined keycode is inputted from the interface or is registered in the controller; and
    the plurality of limited functions includes each of:
       a function to maintain the marine vessel at a position;
       a function to cause the marine vessel to travel at a constant speed;
       a function to automatically operate the marine vessel; and
       a function to cooperate with a marine vessel maneuvering assisting device other than the marine vessel propulsion system.

11. The marine vessel propulsion system according to claim 10, wherein, if the predetermined keycode includes valid period information, the restriction cancellation unit cancels the restriction effected by the restriction unit during a valid period indicated by the valid period information.

* * * * *